(No Model.)
R. B. ADAMS.
DUST PAN ATTACHMENT.
No. 515,036.　　　　　　　　Patented Feb. 20, 1894.
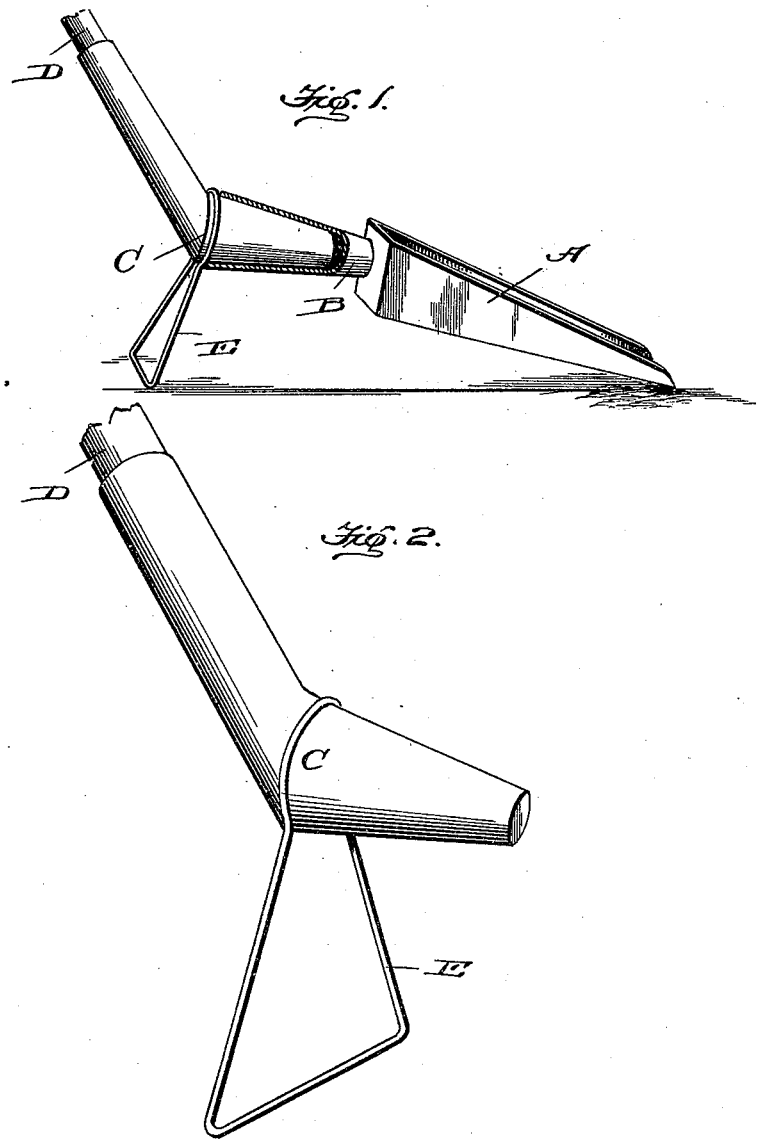
Witnesses
Wm C. Dashiell
May E. Moore
Russell B. Adams,
Inventor
Wm J. Moore,
Atty

UNITED STATES PATENT OFFICE.

RUSSELL B. ADAMS, OF WESTERVILLE, OHIO.

DUST-PAN ATTACHMENT.

SPECIFICATION forming part of Letters Patent No. 515,036, dated February 20, 1894.

Application filed May 9, 1893. Serial No. 473,514. (No model.)

*To all whom it may concern:*

Be it known that I, RUSSELL B. ADAMS, a citizen of the United States, residing at Westerville, in the county of Franklin and State of Ohio, have invented certain new and useful Improvements in Dust-Pan Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in dust pan attachments, and the object of my invention is the provision of a simple, cheap and durable device which can be easily applied to a dust pan for the purpose of holding the pan in proper position to receive the dust without causing the person to bend from the natural standing position and thus provide a practical and useful household article.

The invention consists of the novel dust pan attachment embodying novel features of construction and arrangement of parts substantially as shown and described.

Figure 1 represents a perspective view of the device applied in proper position to a dust pan, and Fig. 2 represents a perspective view of the device detached.

Referring by letter to the drawings, A designates a dust pan provided with the usual handle B and to which my attachment is applied. The attachment consists of the elbow or socket piece C one end of which engages the handle and the other end receives the lower end of the staff or handle D, and the elbow is supported at the proper incline with reference to the dust pan and floor by the bail or arm E, and it will be seen that the pan is properly inclined to receive the dust and the device can thus be used without tiring the user. The elbow may be made round or rather curved or it may be an angle elbow as desired. The lower end of the staff or handle fits snugly in the upper end of the elbow and the other end of the elbow may fit over the handle of the dust pan or in the handle.

It is evident that I provide a device which can be applied or detached with ease and which is simple, cheap and practical.

I claim—

1. A dust pan attachment, consisting of a double socket piece or elbow having one end connected to the handle of the dust pan and the other end receiving the lower end of the handle or staff for moving the pan and a rest or support connected to the socket piece and supporting the dust pan at the proper incline.

2. A dust pan attachment, consisting of a double socket piece or elbow adapted to be connected to the handle of the pan and to the operating staff or handle and having a support provided with a broad base, for holding the pan at the proper incline.

3. The combination with the pan, of the elbow having the lower end connected to the handle thereof, the staff or handle fitting in the upper end of the elbow and the arm carried by the elbow and supporting the pan at the proper incline.

In testimony whereof I affix my signature in presence of two witnesses.

RUSSELL B. ADAMS.

Witnesses:
F. M. RAUCK,
J. M. WEIBLING.